(12) United States Patent
Treslo

(10) Patent No.: US 8,210,389 B2
(45) Date of Patent: Jul. 3, 2012

(54) DRAIN APPARATUS

(76) Inventor: William Treslo, Colorado Springs, CO (US)

(*) Notice: Subject to any disclaimer, the term of this patent is extended or adjusted under 35 U.S.C. 154(b) by 0 days.

(21) Appl. No.: 13/174,750

(22) Filed: Jun. 30, 2011

(65) Prior Publication Data

US 2011/0259893 A1    Oct. 27, 2011

Related U.S. Application Data

(63) Continuation-in-part of application No. 12/545,072, filed on Aug. 21, 2009, now abandoned.

(51) Int. Cl.
*B65D 1/34* (2006.01)

(52) U.S. Cl. .................. 220/571; 141/98

(58) Field of Classification Search .............. 220/571, 220/571.1, 573; 141/98
See application file for complete search history.

(56) References Cited

U.S. PATENT DOCUMENTS

| | | | |
|---|---|---|---|
| 3,410,438 A * | 11/1968 | Bartz | 220/573 |
| 4,301,841 A * | 11/1981 | Sandow | 141/98 |
| 4,524,866 A | 6/1985 | Pollacco | |
| 4,673,081 A * | 6/1987 | Habig et al. | 206/223 |
| 4,802,599 A * | 2/1989 | Hill | 220/573 |
| 4,881,650 A * | 11/1989 | Bartz | 220/573 |
| 5,285,824 A | 2/1994 | Krstovic | |
| 5,477,897 A | 12/1995 | Scofield | |
| 5,503,246 A * | 4/1996 | Raboin et al. | 184/1.5 |
| 5,975,156 A | 11/1999 | Senour | |
| 6,085,806 A | 7/2000 | Davis et al. | |
| 6,880,589 B2 * | 4/2005 | Camoli | 141/98 |

* cited by examiner

*Primary Examiner* — Harry Grosso
(74) *Attorney, Agent, or Firm* — Roger A. Jackson

(57) ABSTRACT

The present invention is a drain apparatus and method that is adapted to support a portable machine, the apparatus includes a housing with a base, and a surrounding sidewall extending from the base defining an interior. Further included is a margin platform that includes an inner and outer periphery, the outer periphery is adjacent to the surrounding sidewall, the margin platform is oppositely disposed from the base. Also included is a divider disposed adjacent to the inner periphery, the divider having a convex configuration facing the base, the margin platform and the divider separates the interior into a first region and a second region. The divider having an aperture for communication between the first and second regions, the housing having an opening between the second region and an exterior environment. The margin platform supports the portable machine that is suspended over the divider.

5 Claims, 8 Drawing Sheets

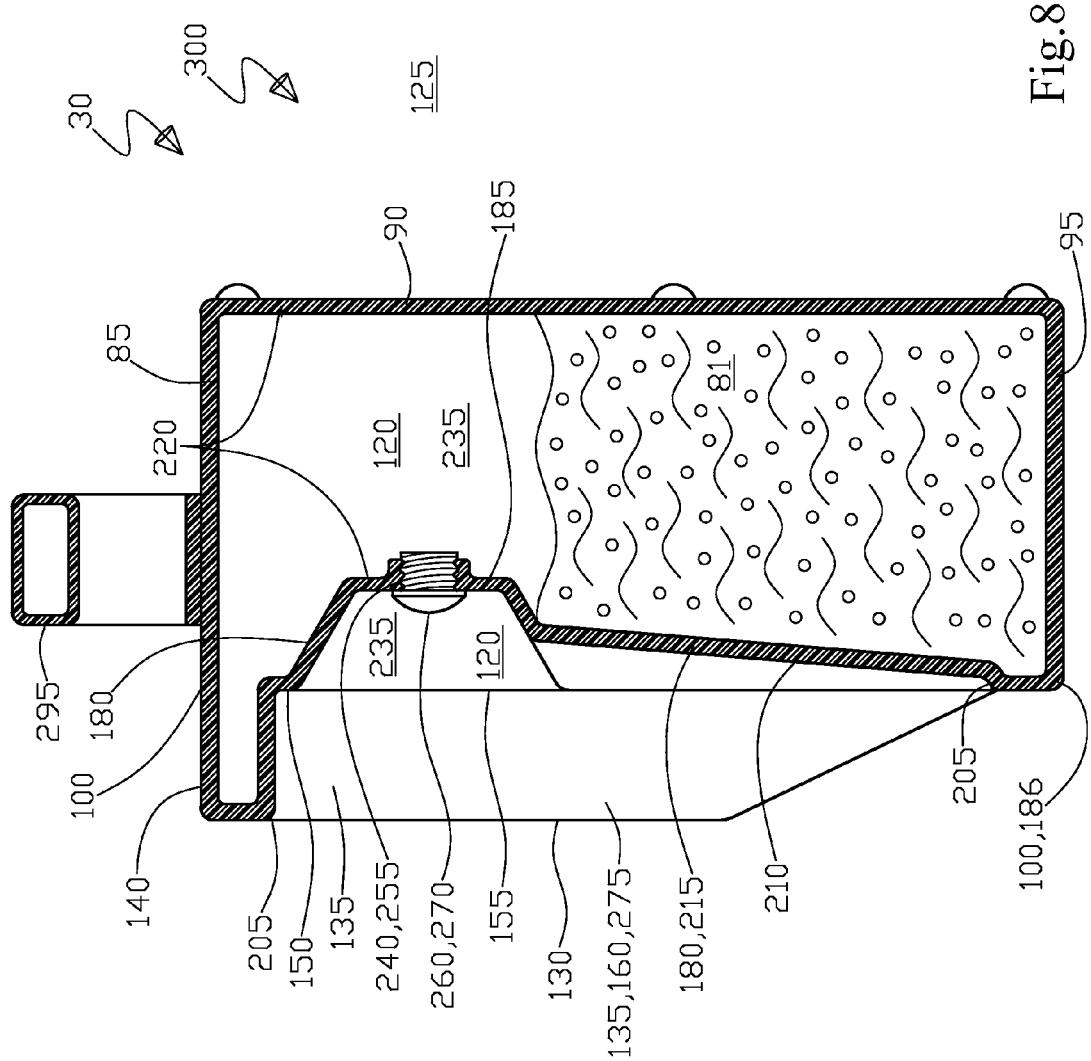

DRAIN APPARATUS

RELATED APPLICATION

This is a continuation in part (CIP) patent application claiming priority from U.S. patent application Ser. No. 12/545,072 filed on Aug. 21, 2009 now abandoned by William Treslo of Colorado Springs, Colo., U.S.

TECHNICAL FIELD

The present invention generally relates to the capturing and storing of waste or used oil from a portable machine. More particularly, the present invention uses a drain apparatus to structurally support a portable vacuum compressor/pump such that an oil change for the compressor head can be accomplished in an orderly and neat manner by the drain apparatus being sized and configured to collect the random spray of used oil from the compressor case drain. Furthermore the drain apparatus provides a convenient place to store the used compressor oil until the used oil can be disposed of.

BACKGROUND OF INVENTION

For air conditioning systems that typically use a refrigerant and a compressor in a closed loop system wherein the compressor raises the pressure of the refrigerant and blows the high pressure refrigerant through an orifice restriction that drops the refrigerant pressure while subsequently cooling the refrigerant, wherein the cooled refrigerant is communicated through an air to refrigerant heat exchanger with the resulting output being cooled air that is used to cool the interior of a building, or a food/drink cooler, freezer or the like. Once the refrigerant communicates through the air heat exchanger, the refrigerant is warmed up in temperature, wherein the refrigerant next goes to what is called a condenser which is basically another air to refrigerant heat exchanger that uses atmospheric air typically with a forced air fan to remove the same amount of heat from the refrigerant that it picked up in cooling the air previously, once the refrigerant communicates through the condenser it then goes to the compressor for the cycle to repeat itself in a continuous manner.

For the previously described system to work properly the refrigerant must be pure in concentration and mixture within the closed loop system, as the heat transfer properties of the refrigerant are critical to the closed loop system working, thus the introduction of contaminates in the refrigerant is very undesirable, this is why normally these systems are "factory sealed" so as to minimize the opportunity of contamination, i.e. especially in the case of a home refrigerator for instance that will run many years with no maintenance. However, on building air conditioning systems and commercial food/beverage cooler and freezers, and for other industrial application where cooling is required, for maintenance purposes the closed system must be opened up, for example to replace or maintain the compressor, replace/repair seals, vales, heat exchangers, and the like. Thus when the repairs and/or replacements are complete and the refrigerant must be replaced within the system, there is an issue of contamination to remove as when the system was previously opened; wherein water, dirt, dust, particulates, and the like have found their way inside of the system, and when the new refrigerant is put into the system, a vacuum pump/compressor is used to remove the contaminates so that as near as possible only "pure" refrigerant remains in the system, thus resulting in acceptable cooling performance.

The end result of this is that the vacuum pump/compressor sucks these contaminates out of the system where they end up in the vacuum pump/compressor oil, further these contaminates can harm the vacuum pump/compressor as well by causing excessive wear in the rotors, and other close clearance moving parts. Thus, because of this; the vacuum pump/compressor oil must be changed frequently, even multiple times on vacuuming out a single air conditioning system, so the need for convenient, clean, and efficient oil changing of the vacuum pump/compressor is important. Further as these oil changes are done in the field or at the project site, the location there is not as convenient as a garage for having the tools and area for oil changes, and as in the commercial world, it is typical that the air conditioning unit is located on the roof of a building, thus this vacuum pump/compressor oil change would be done of the roof, not a easy place to do the oil change, so the oil change is typically done on a very impromptu basis such as using a bucket with the vacuum pump/compressor placed on an elevated ledge, however, when operating this way the oil change is messy and environmentally unsafe as when the oil drain plug is removed the oil discharges under some pressure, typically spraying wherein only a portion of the oil goes into the bucket and the rest of the oil ends up on the roof, walls, and on the person changing the oil. This is as opposed to changing oil in an automotive engine, wherein the oil is changed in a garage as it is changed much less frequently also, plus the oil drains out at a slow rate because the oil in an automotive engine in not under any pressure when the engine is off.

As the vacuum pump/compressor has unique needs especially as related to oil changing, a specialized drain apparatus unique to vacuum pumps/compressors could be very useful, however, in looking at the prior art for specialized oil drain apparatus, only applications for the automotive industry were found, however, following is a sampling of the most relevant prior art in the drain apparatus arts. Starting with U.S. Pat. No. 5,285,824 to Krstovic, disclosed is an automotive oil drainage catch pan having an open top for receiving used engine oil drained therein and has a reservoir on one end of the pan with a discharge spout and a container connected by a coupling to the spout. In Krstovic, after collecting the used oil in the catch pan, the catch pan is tilted causing the used oil to flow to the reservoir and drain through the spout into the container for containment and transport to a suitable location, wherein having the drain or catch pan and reservoir are in fluid communication.

Continuing in the automotive oil change arts, however, being for residual new oil recovery in U.S. Pat. No. 5,477,897 to Scofield disclosed is a collection system for gathering new oil or other fluids from individual small containers usually, but not necessarily, of the single quart variety. A ported container in Scofield having a sloping shape on at least one side akin to a funnel contains an outlet port for the draining oil to pass into a storage container through a manifold type arrangement. The opposing side of the container in Scofield contains six ports adapted to receive single quart oil containers or the like, inverted, thereby allowing the dregs of oil to drain out onto the slopes of the opposing side of the container. The outlet of the container in Scofield is particularly adapted to fit into the opening of a storage container, and legs on the container complement the fit to a storage container. The storage container in Scofield is provided with a drain in order that the oil might be saved and used in an engine as originally intended, further the storage container also includes a window with indicia to quickly show the amount of oil recovered, see column 1, lines 54-67, and column 2, lines 1-2.

Further in the automotive prior art drain pan area, in U.S. Pat. No. 4,524,866 to Pollacco disclosed is an oil catch pan is provided as a self-supporting structure for the oil that is drained only, having a bottom wall and an upstanding peripheral sidewall with a rim where the pan is open at the top. The pan in Pollacco is designed to be slid under an automotive motor vehicle and used to catch the oil being drained from the crankcase. The bottom wall in Pollacco of the pan is initially provided with a closure which is designed to be effectively opened, e.g. by pulling a conveniently located tab or by interaction with a piercing structure which is fitted between the pan and the jug, see column 2, lines 18-27. Pollacco's focus is primarily upon the drain mechanism that allows a remote drain port opening to be effectuated without an individual immersing or wetting their hand in the oil.

Next, again in the automotive prior art drain pan area, in U.S. Pat. No. 5,975,156 to Senour disclosed an apparatus for collecting, storing and dumping used motor oil includes an oil container having a top, a bottom and sides and having at least one funnel connector opening sized and configured to removably receive a mating funnel connector member therein. In Senour, at least one funnel having a funnel cup and a funnel connector member is connected to and in communication with the funnel cup, the funnel connector member having a size and shape which is removably lockably receivable into the at least one funnel connector opening, see column 2, lines 13-22.

Continuing, also again in the automotive drain arts, in U.S. Pat. No. 6,085,806 to Davis, et al. disclosed an oil drain kit for collecting used motor oil comprising an oil drain collection pan, having a bottom wall raised at the center and sloping to its marginal extremity where it is joined with a side wall having a radial flange at the top of the wall and which extends circumferentially thereabout with a downwardly extending edge portion. The bottom wall in Davis, et al. is provided at its extremity adjacent its junction with the side wall with at least three discharge openings, each with a funnel spout extending downwardly there from. The spouts in Davis, et al. are adapted to receive the necks of empty oil containers which connect therewith and serve as supporting legs for the drain collection pan. A tray in Davis, et al. receives the containers when placed therein and facilitates sliding the kit under the oil drain plug of a motor to collect used oil draining there from and for removing it when draining is completed. The tray in Davis, et al. when inverted also serves as a cover for the kit, which may include empty or full oil containers in its drain pan for storage purposes or for marketing. Projections on the inner face in Davis, et al. of the tray side wall are adapted to latchingly engage the edge of the drain pan flange when the tray cover is slipped thereover. A circular bead in Davis, et al. on the bottom of the tray becomes located at the top of the kit when the tray is used as a cover and allows stacking of kits and prevents an upper kit from sliding off the lower kit on which it rests. However, there is some concern in Davis, et al. that the height of the drain pan that is supported by typical 1 quart or 1 liter oil bottles would be too high to work with a lot of cars without jacking the vehicle up from the floor, however, trucks should not have a height problem with the drain pan being too high to insert under the engine oil drain plug without jacking the vehicle up off the floor.

What is needed in the field is a drain apparatus that specifically accommodates an integrated system that is specific for being in contact with and the drain apparatus physically supporting the machine or vacuum pump/compressor in this case, wherein the drain apparatus makes changing the oil in the machine as easy and clean as possible. Thus the better drain apparatus would support the machine such that the oil drain area would be custom fit for the machine oil drain down area capturing the pressurized oil splatter while at the same time providing an oil transport and storage container, plus a spill catch when the machine is being filled with new oil.

SUMMARY OF INVENTION

The present invention is a drain apparatus that is adapted to receive and support a portable machine assembly, the drain apparatus includes a housing with a base portion, and a surrounding sidewall extending upwardly therefrom the base portion to define a housing interior as separated from an exterior environment. Further included in the drain apparatus is a partial margin extension portion that includes an inner periphery and an outer periphery, the outer periphery is adjacent to the surrounding sidewall, wherein the margin platform portion is oppositely disposed from the base portion. Also included in the drain apparatus is a divider disposed adjacent to the inner periphery, the divider having a convex configuration as facing the base portion, the margin platform portion and the divider separates the housing interior into a first region and a second region. The divider having an aperture for communication therethrough as between the first and second regions, the housing having an opening communicating as between the second region and the exterior environment. The margin platform portion is adapted to receive and support the portable machine assembly that is suspended over said divider.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 8 shows cross section view 8-8 from FIG. 2 of the drain apparatus that specifically details the divider that has the angled portion and planar portion configuration with the aperture having the cover placing the aperture into the closed state, and the support shoulder, the housing with the surrounding sidewall, the base portion, with first region having contaminated oil, the second region, and handle, note that this in the transport state when taking the drained contaminated oil in the drain apparatus to a recycling station.

REFERENCE NUMBERS IN DRAWINGS

Figure 1:
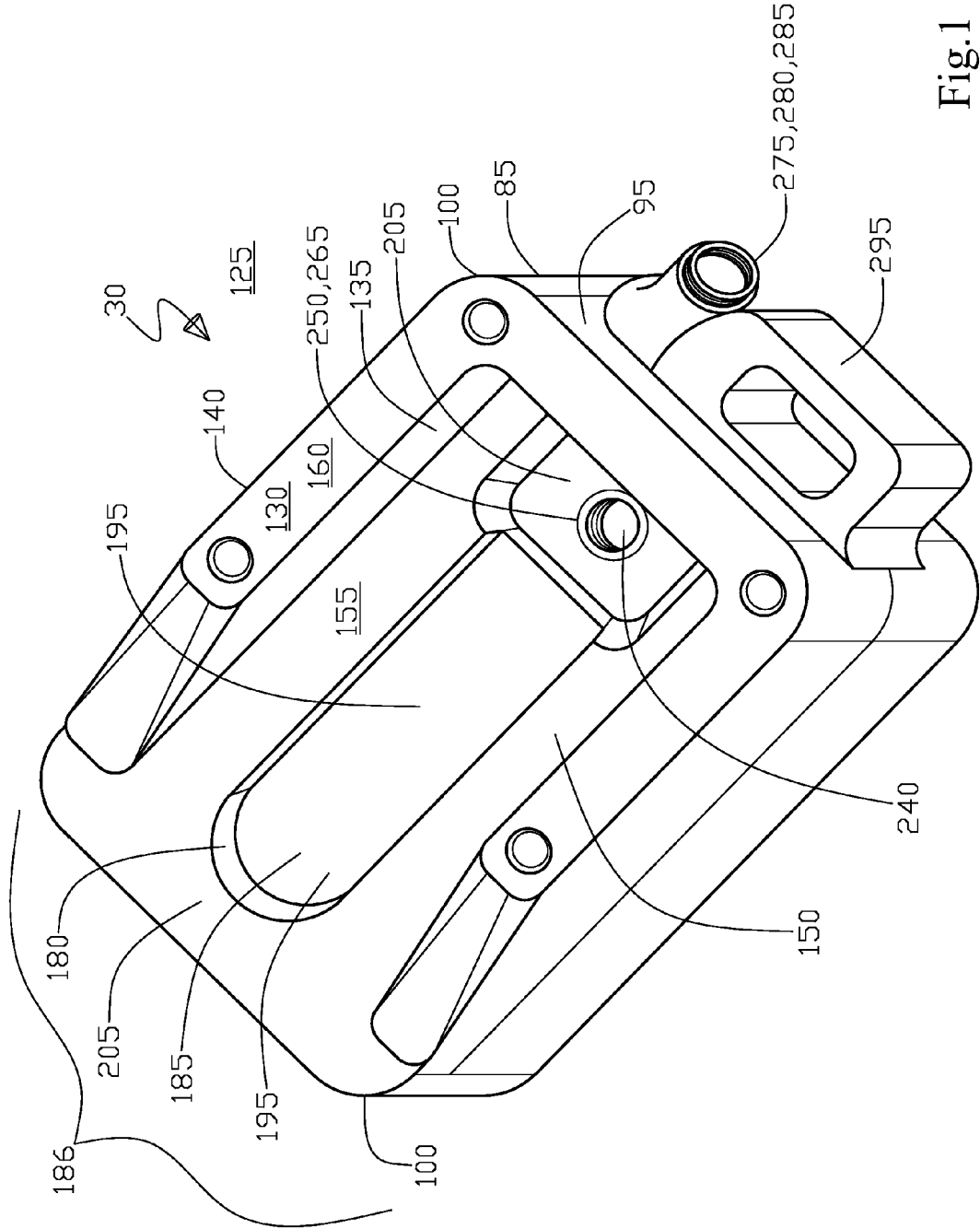
FIG. 1 shows a perspective upper view of the drain apparatus specifically detailing the divider that is in the skewed pyramid configuration with the aperture and the support shoulders, the housing with the surrounding sidewall, and handle.

30 Drain Apparatus
35 Portable machine assembly
40 Support feet of the portable machine assembly 35
45 Suspending the portable machine assembly 35 over the divider 180
50 Activating the portable machine assembly 35
55 Support the portable machine assembly 35 weight of at least twenty pounds
60 Portable motor vacuum pump
61 Pump portion of the portable motor vacuum pump 60
62 Motor portion of the portable motor vacuum pump 60
65 Support feet of the portable motor vacuum pump 60
70 Straddling the portable motor vacuum pump 60 over the divider 180
75 Activating the portable motor vacuum pump 60
80 Support the portable motor vacuum pump 60 weight of at least thirty pounds
81 Contaminated oil
85 Housing
90 Base portion
95 Surrounding sidewall
100 Upper end portion and termination of sidewall 95
105 Reinforcing structure
110 Configuring reinforcing structure 105 to allow fluid communication in the first region 230
120 Interior
125 Exterior environment
130 Partial margin extension portion
135 Inner periphery of margin extension portion 130
140 Outer periphery of margin extension portion 130
145 Oppositely disposed parallel position of the motor vacuum pump mount platform portion 150 to the base portion 90
150 Motor vacuum pump mount platform portion to receive and support the portable machine assembly 35 or the portable motor vacuum pump 60, wherein the motor vacuum pump mount platform portion is recessed toward the base portion 90 where the partial margin extension portion 130 is present that forms a blow down 515 oil 81 spray guard
155 Matting interface of the motor vacuum pump mount platform portion with the support feet 40 or 65 of the portable machine assembly 35 or motor vacuum pump 60 respectively
160 Support shoulder
165 Opposing parallel orientation of the support shoulders 165
170 Oppositely disposed parallel position from the base 90 to the support shoulders 165
180 Divider
185 Convex configuration of divider 180
186 Portion of convex configuration 185 adjacent to surrounding sidewall 95 upper portion termination 100
190 Facing base portion 90 of convex configuration 185 of the divider 180
195 Skewed pyramid configuration of the divider 180
205 Divider disposed between opposing upper end portions 100
210 Angled portion of divider 180
215 Substantially planar portion of divider 180
220 Parallel orientation of planar portion 215 to the base 90
230 First region
235 Second region
240 Aperture
250 Aperture positioned at the peak of the pyramid 195
255 Aperture disposed in the planar portion 215
260 Cover that is removably engagable to the aperture 240
265 Open state of cover 260
270 Closed state of cover 260
275 Opening of housing 85 as between the second region 235 and the exterior environment 125
280 Fluid communication port
285 Open state of port 280
290 Closed state of port 280
295 Handle
300 Transportation state for taking contaminated oil 81 to a recycling station
500 Placing the portable motor vacuum pump 60 such that the support feet 65 are disposed within the partial margin extension portion 130 and being supported upon the platform portion 155 of the divider 180
505 Positioning the portable motor vacuum pump 60 to orient the pump 61 to be suspended over the aperture 240
510 Draining the oil 81 from the pump 61 onto the divider 180, wherein the oil 81 eventually flow toward the aperture 240
515 Blowing down the pump 61

DETAILED DESCRIPTION

Figure 2:
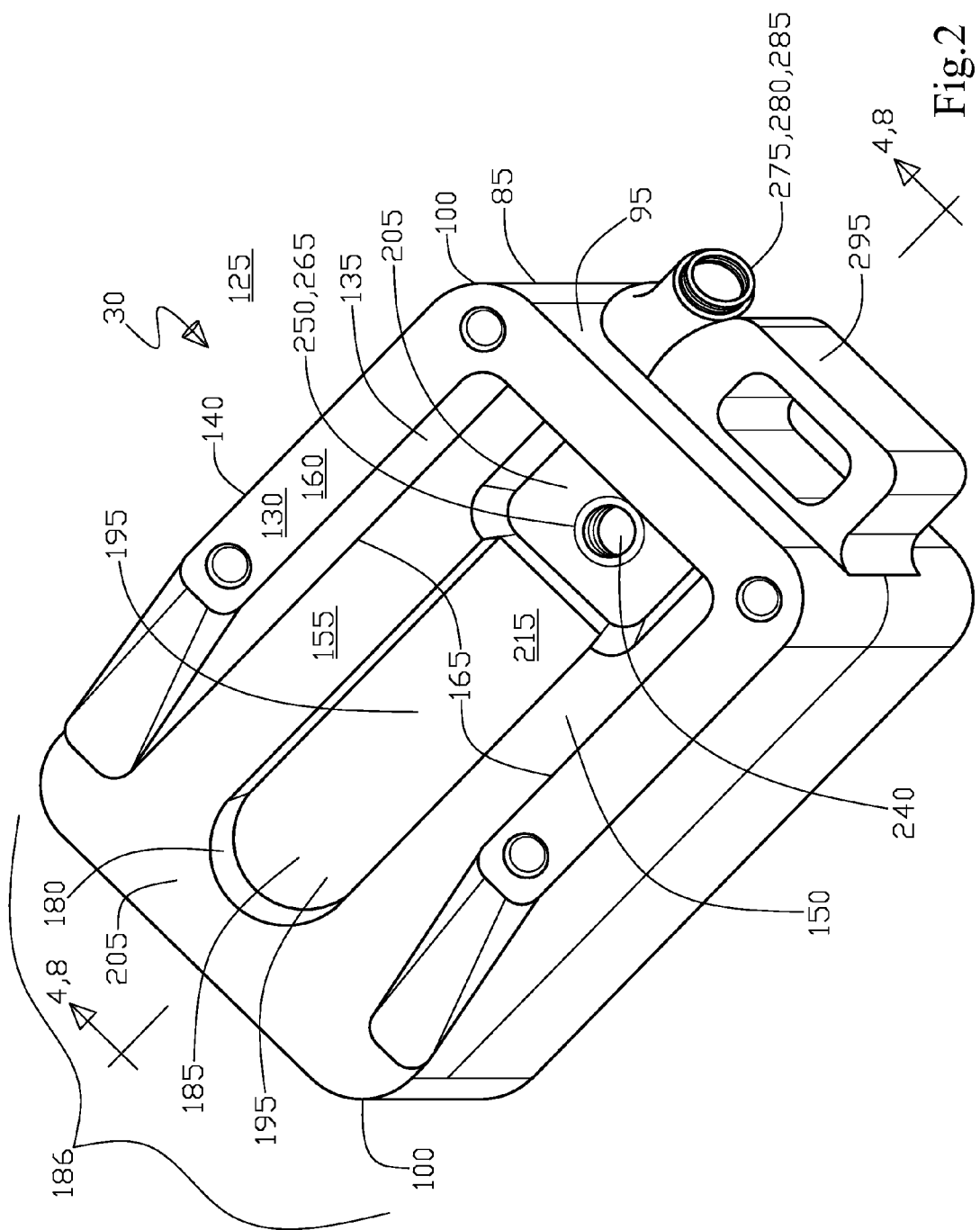
FIG. 2 shows a perspective upper view of the drain apparatus specifically detailing the divider that has the angled portion and planar portion configuration with the aperture and the support shoulders, the housing with the surrounding sidewall, and handle.
Figure 3:
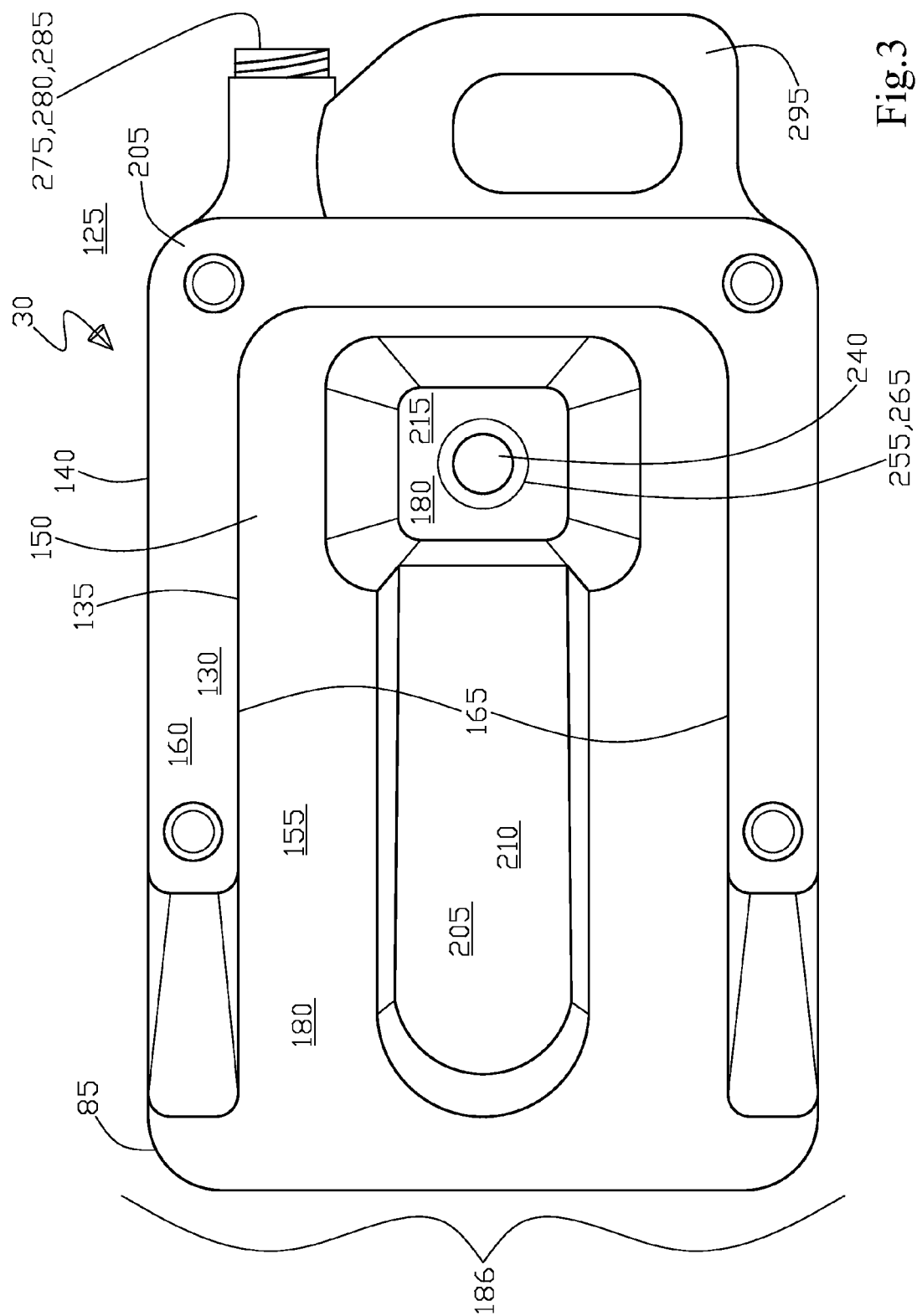
FIG. 3 shows a top view of the drain apparatus with the divider that has the angled portion and planar portion configuration with the aperture and the support shoulders.

With initial reference to FIG. 1 shown is a perspective upper view of the drain apparatus 30 specifically detailing the divider 180 that is in the skewed pyramid 195 configuration with the aperture 240 and the support shoulders 160, the housing 85 with the surrounding sidewall 95, and handle 295. Continuing, FIG. 2 shows a perspective upper view of the drain apparatus 30 specifically detailing the divider 180 that has the angled portion 210 and the planar portion 215 configuration with the aperture 240 and the support shoulders 160, the housing 85 with the surrounding sidewall 95, and handle 295. Further, FIG. 3 shows a top view of the drain apparatus 30 with the divider 180 that has the angled portion 210 and planar portion configuration 215 with the aperture 240 and the support shoulders 160.

Figure 4:
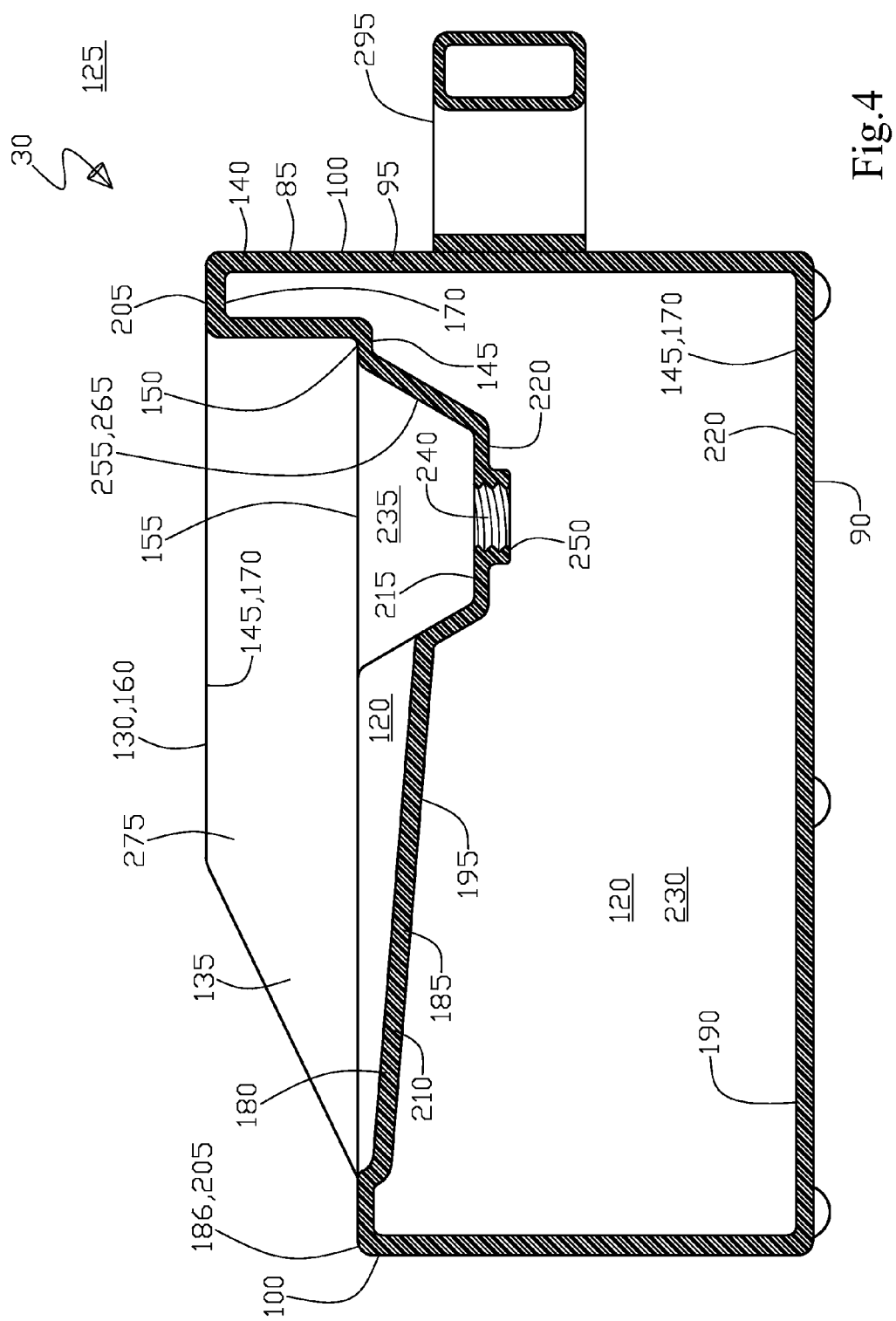
FIG. 4 shows cross section view 4-4 from FIG. 2 of the drain apparatus that specifically details the divider that has the angled portion and planar portion configuration with the aperture in the open state, and the support shoulder, the housing with the surrounding sidewall, the base portion, with first region having contaminated oil, the second region, and handle.

Next, FIG. 4 shows cross section view 4-4 from FIG. 2 of the drain apparatus 30 that specifically details the divider 180 that has the angled portion 210 and planar portion 215 configuration with the aperture 240 in the open state 265, and the support shoulder 160, the housing 85 with the surrounding sidewall 95, the base portion 90, with the first region 230 having contaminated oil 81, the second region 235, and handle 295. Further, FIG. 5 shows an upper perspective view of the drain apparatus 30 in use with the portable motor vacuum pump assembly 60 in its preferred positional orientation, specifically with the pump portion 61 straddling over the divider 180, with the support shoulders 160, the housing 85 with the surrounding sidewall 95, and the handle 295 also shown.

Figure 5:
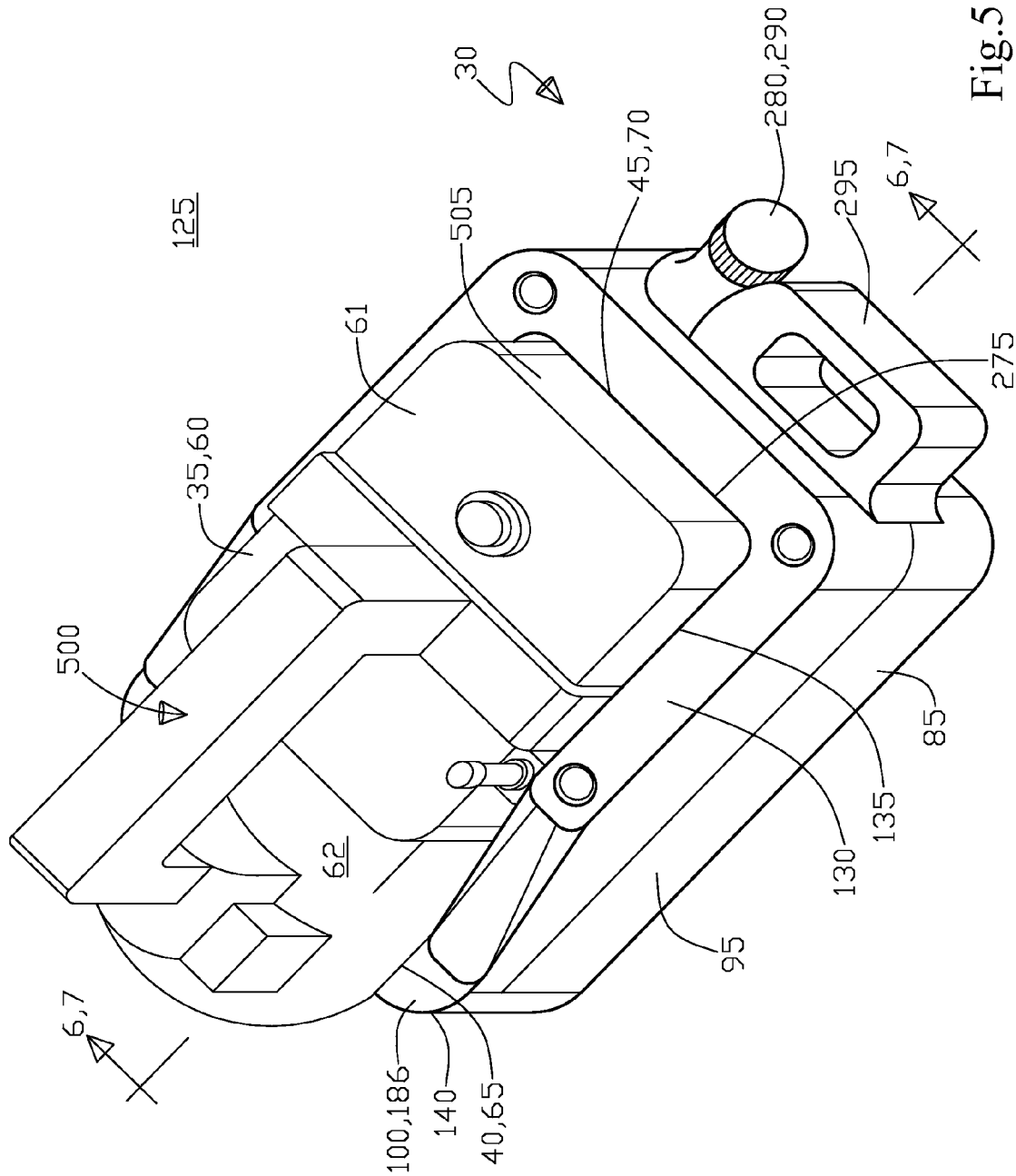
FIG. 5 shows an upper perspective view of the drain apparatus in use with the portable motor vacuum pump assembly in its preferred positional orientation, specifically with the pump portion straddling over the divider, with the support shoulders, the housing with the surrounding sidewall, and the handle is also shown.
Figure 6:
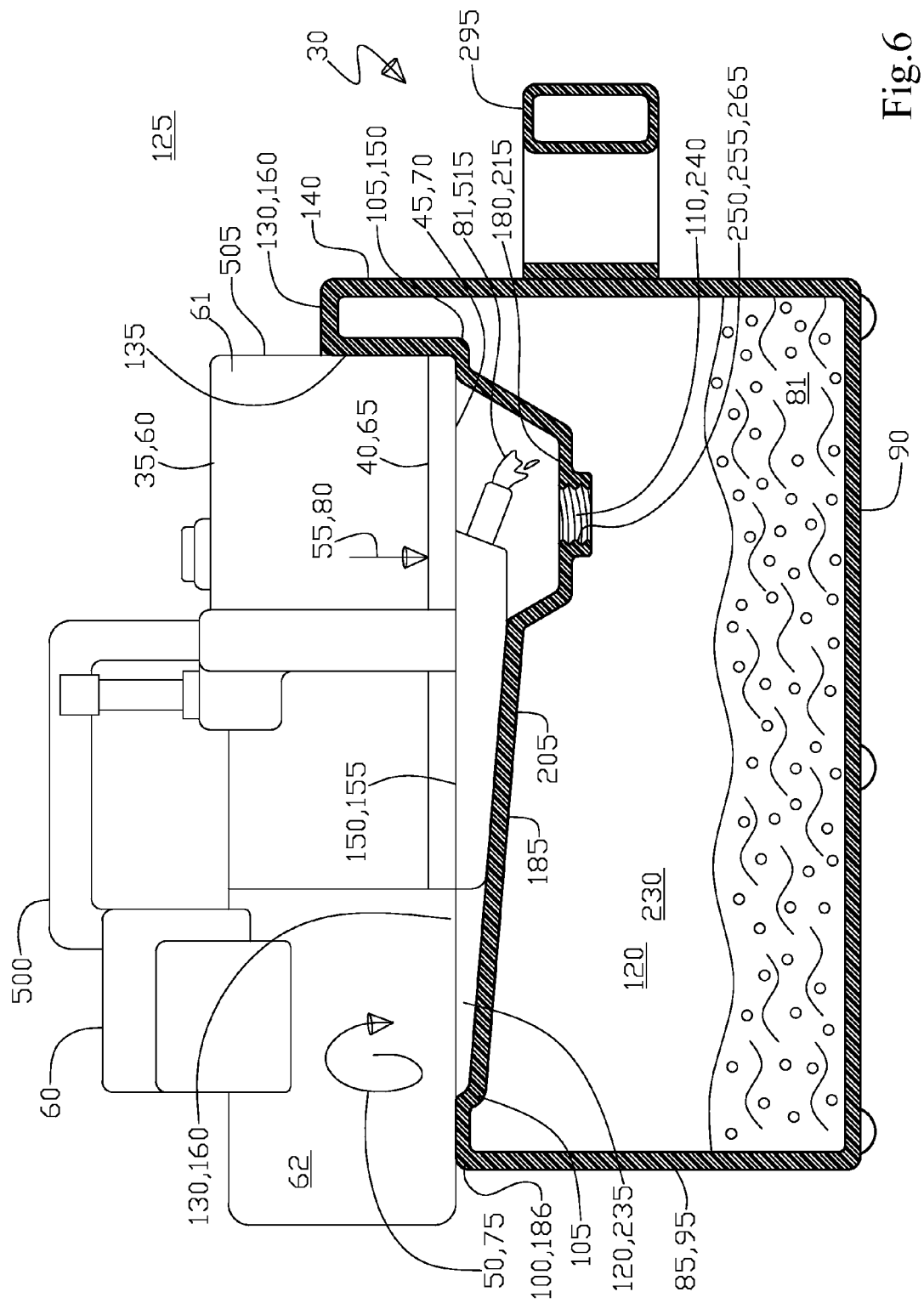
FIG. 6 shows cross sectional view 6-6 from FIG. 5 of the drain apparatus in use in cross section with the portable motor vacuum pump not in cross section, wherein the portable motor vacuum pump is in its preferred positional orientation, specifically with the pump portion straddling over the divider, with the support shoulder, the housing with the surrounding sidewall, the divider that has the angled portion and planar portion configuration with the aperture, with first region having contaminated oil, the second region, and the handle is also shown, note that this view can show the blow down function of the pump.

Moving ahead, FIG. 6 shows cross sectional view 6-6 from FIG. 5 of the drain apparatus 30 in use in cross section with the portable motor vacuum pump 60 not in cross section, wherein the portable motor vacuum pump 60 is in its preferred positional orientation, specifically with the pump portion 61 straddling over the divider 180, with the support shoulder 160, the housing 85 with the surrounding sidewall 95, the divider 180 that has the angled portion 210 and planar portion configuration 215 with the aperture 240, with first region 230 having contaminated oil 81, the second region 235, and the handle 295 also shown, note that this view can show the blow down 515 function of the pump 61.

Figure 7:
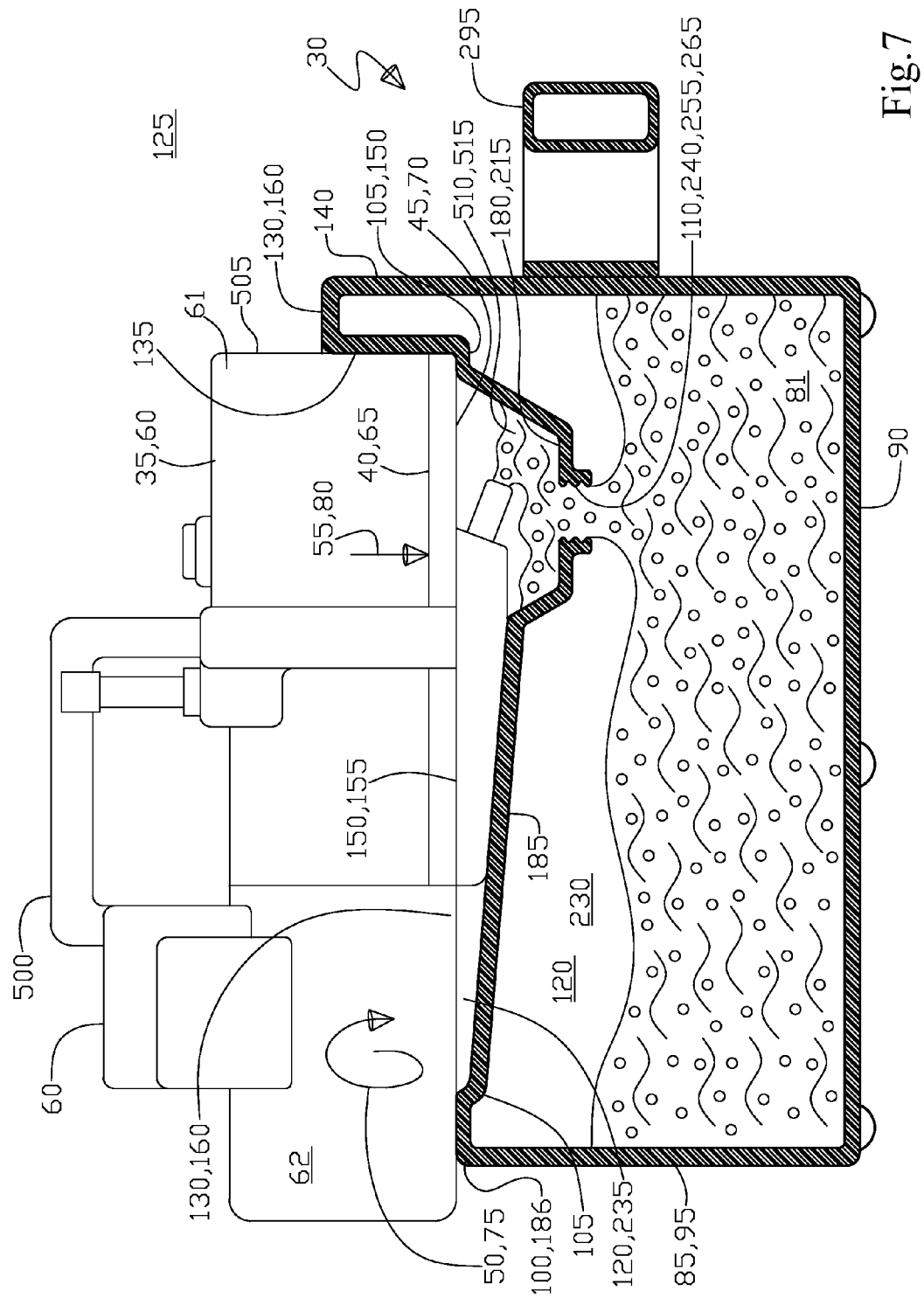
FIG. 7 shows cross sectional view 7-7 from FIG. 5 of the drain apparatus in use in cross section with the portable motor vacuum pump not in cross section, wherein the portable motor vacuum pump is in its preferred positional orientation, specifically with the pump portion straddling over the divider, with the support shoulder, the housing with the surrounding sidewall, the divider that has the angled portion and planar portion configuration with the aperture, with first region having contaminated oil, the second region also having contaminated oil that is draining through the aperture, and the handle is also shown, note that this view can show the oil draining function of the pump.

Continuing, FIG. 7 shows cross sectional view 7-7 from FIG. 5 of the drain apparatus 30 in use in cross section with the portable motor vacuum pump 60 not in cross section, wherein the portable motor vacuum pump 60 is in its preferred positional orientation, specifically with the pump portion 61 straddling over the divider 180, with the support shoulder 160, the housing 85 with the surrounding sidewall 95, the divider 180 that has the angled portion 210 and planar portion 215 configuration with the aperture 240, with first region 230 having contaminated oil 81, the second region 235 also having contaminated oil 81 that is draining 510 through the aperture 240, and the handle 295 is also shown, note that this view can show the oil draining 510 function of the pump 61. Further, FIG. 8 shows cross section view 8-8 from FIG. 2 of the drain apparatus 30 that specifically details the divider 180 that has the angled portion 210 and planar portion configuration 215 with the aperture 240 having the cover 255 placing the aperture 240 into the closed state 270, and the support shoulder 160, the housing 85 with the surrounding sidewall 95, the base portion 90, with first region 230 having contaminated oil 81, the second region 235, and handle 295, note that this is in the transport state 300 when taking the drained 510 contaminated oil 81 in the drain apparatus 30 to a recycling station.

Broadly, as best shown in FIGS. 1 to 4, the present invention is a drain apparatus 30 that is adapted to receive and support a portable machine assembly 35, the drain apparatus 30 includes a housing 85 with a base portion 90, and a surrounding sidewall 95 extending upwardly therefrom the base portion 90 to define a housing interior 120 as separated from an exterior environment 125. Further included in the drain apparatus 30 is a partial margin extension portion 130 that includes an inner periphery 135 and an outer periphery 140, the outer periphery 140 is adjacent to the surrounding sidewall 95, wherein the partial margin extension portion 130 is oppositely disposed 145 from the base portion 90. Also included in the drain apparatus 30 is a divider 180 disposed adjacent to the inner periphery 135, the divider 180 having a convex configuration 185 as facing 190 the base portion 90, the partial margin extension portion 130 and the divider 180 separates the housing 85 interior 120 into a first region 230 and a second 235 region, as best shown in FIGS. 4, 6, 7, and 8. The divider 180 having an aperture 240 for communication therethrough as between the first 230 and second 235 regions, the housing 85 having an opening 275 communicating as between the second region 235 and the exterior environment 125. The partial margin extension portion 130 is adapted to receive and support 150 the portable machine assembly 35 that is suspended 45 over the divider 180.

The preferred materials of construction for the housing 85, being the base 90, the surrounding sidewall 95, the partial margin extension portions 130 or support shoulders 160, and divider 180 are of molded plastic, however, other materials would be acceptable that could meet the functional requirements of containing the contaminated oil, external environment, and be able to support the weight of the portable machine assembly 35 or portable motor vacuum pump 60 that is in the range of about thirty five pounds. Note that the portable motor vacuum pump 60 is sometimes used interchangeably with pump/compressor, although it is a term of art that it is called a vacuum pump, however, the "pump" functions by processing a gas/liquid-solid mixture when cleaning the interior of the refrigerant system and thus the use of compressor would be correct also.

Optionally, on the drain apparatus 30 the convex configuration can be in the form of a skewed pyramid 195, wherein the aperture 240 is positioned 250 at a peak of the skewed pyramid 195, as best shown in FIG. 1. Further on the aperture 240 or 250 optionally can include a removably engagable cover 260, as best shown in FIG. 8, wherein the cover 260 is operational to facilitate the aperture 240 or 250 to be in an open state 265, see FIG. 7, for allowing fluid communication, typically in the form of contaminated oil 81 from the second region 235 to the first region 230 and a closed state 270, see FIG. 8, that precludes fluid communication, also typically in the form of contaminated oil 81 from the second region 235 to the first region 230.

In addition, on the drain apparatus 30, an option can be had for optionally having a fluid communication port 280 disposed in the housing 85, as between the first region 230 and the exterior environment 125, wherein the fluid communication port 280 has an open state 285 for allowing fluid communication, typically the contaminated oil 81 from the first region 230 to the exterior environment 125, see FIG. 8, and a closed state 290 that precludes communication typically the contaminated oil 81 from the first region 230 to the exterior environment 125, see FIG. 6. Also, optionally, for the drain apparatus 30 could further comprise a handle 209 adjacent to the surrounding sidewall 95, wherein the handle 290 is operational to be manual handhold for moving the drain apparatus 30, see FIGS. 1, 2, and 4 through 8.

A key aspect of the drain apparatus 30 is that it is adapted to receive and support the portable machine assembly 35, through structural support in the housing 85, wherein the partial margin extension portion 130 is sized and configured to mate 155 with support feet 40 of the portable machine assembly 35 and to further support the portable machine assembly 35 when the portable machine assembly 35 is activated 50 for a portion of the time, see FIGS. 5, 6, and 7. In other words to turn on the portable machine assembly 35 while it is supported by the drain apparatus for the purpose of blowing down 515 the pump by driving out the remaining contaminates from the residual oil in the pump after draining 510. Further to this ability for the drain apparatus 30 that is adapted to receive and support a portable machine assembly 35, wherein the partial margin extension portion 130 and the base portion 90 can further comprise a reinforcing structure 105 disposed as between the partial margin extension portion 130 and the base portion 90, wherein the reinforcing structure 105 is disposed within the first region 230, with the reinforcing structure 105 being operational to support 55 a portable machine assembly 35 weight of at least about twenty (20) pounds, as best shown in FIGS. 5, 6, and 7. Also, the reinforcing structure 105 is preferably configured 110 to allow fluid communication, meaning typically the contaminated oil 81 to freely flow within the first region 230, such that as best shown in FIGS. 6 and 7, in allowing either the aperture 240 or 250 to allow the contaminated oil 81 to flow from the second region 235 to the first region 230, in addition to the option of the contaminated oil 81 freely flowing from the first region 230 to the external environment 125 via port 280 that is in the open state 285, as best shown in FIG. 8, wherein typically the first region 230 contaminated oil 81 is drained into another container. Note that the reinforcing structure 105 can many other type of structures, such as thicker sidewalls, cross braces, or external bracing to the sidewall, or any other type of reinforcing structure 105 would be acceptable for the loads from the portable machine assembly 35 weight or portable motor vacuum pump 60 weight as previously stated and shown in FIGS. 6 and 7.

A more specific embodiment, in looking at FIGS. 2 through 8, would be in drain apparatus 30 adapted to receive and support a portable motor vacuum pump 60, that includes a housing including a base portion 90, and a surrounding sidewall 95 extending upwardly therefrom the base portion 90, wherein the surrounding sidewall 95 terminates in an upper end portion 100, the base 90 and surrounding sidewall 95 define a housing interior 120 as separated from an exterior environment 125. Further included are support shoulders 160 that are in an opposing 165 parallel orientation to one another, wherein the shoulders 160 are adjacent to the upper end portion 100, the shoulders 160 are also oppositely 170 disposed from the base portion 90, the support shoulders 160 are sized and configured 175 to support the portable motor vacuum pump 60.

Continuing on the more specific embodiment of the drain apparatus 30, the divider 180 is disposed adjacent to and in-between the pair of opposing support shoulders 160, further the divider 160 is disposed 205 between the upper end portions 100 in an opposing orientation, with the divider 180 having an angled portion 210 toward the base 90 and a substantially planar portion 215 that is parallel 220 to the base 90, the pair of support shoulders 160 and the divider 180 separates the housing interior 120 into a first region 230 and a second region 235. The divider 180 having an aperture 240 disposed 255 in the planar portion 215, the aperture 240 is for communication therethrough as between the first 230 and second 235 regions, the housing 85 having an opening 275 communicating as between the second region 235 and the exterior environment 125. The pair of support shoulders 160 support the portable motor vacuum pump 60 to straddle 70 over and above the divider 180.

A key aspect of the specific embodiment of the drain apparatus 30 is that it is adapted to receive and support the portable motor vacuum pump 60, through structural support in the housing 85, wherein the support shoulders 160 are sized and configured to help support feet 65 of the portable motor vacuum pump 60 and to further support the portable motor vacuum pump 60 when the portable motor vacuum pump 60 is activated 75 for a portion of the time, see FIGS. 5, 6, and 7. In other words to turn on the portable motor vacuum pump 60 while it is supported by the drain apparatus 30 for the purpose of blowing down 515 the pump 61 by driving out the remaining contaminates from the residual oil 81 in the pump after draining 510. Further to this ability for the drain apparatus 30 that is adapted to receive and support a portable motor vacuum pump 60, wherein the support shoulder 160 and the base portion 90 can further comprise a reinforcing structure 105 disposed as between the support shoulder 160 and the base portion 90, wherein the reinforcing structure 105 is disposed within the first region 230, with the reinforcing structure 105 being operational to support 80 a portable motor vacuum pump 60 weight of at least about thirty (30) pounds, as best shown in FIGS. 5, 6, and 7. Also, the reinforcing structure 105 is preferably configured 110 to allow fluid communication, meaning typically the contaminated oil 81 to freely flow within the first region 230, such that as best shown in FIGS. 6 and 7, in allowing either the aperture 240 or 250 to allow the contaminated oil 81 to flow from the second region 235 to the first region 230, in addition to the option of the contaminated oil 81 freely flowing from the first region 230 to the external environment 125 via port 280 that is in the open state 285, as best shown in FIG. 8, wherein typically the first region 230 contaminated oil 81 is drained into another container. Note that the reinforcing structure 105 can many other type of structures, such as thicker sidewalls, cross braces, or external bracing to the sidewall, or any other type of reinforcing structure 105 would be acceptable for the loads from the portable machine assembly 35 weight or portable motor vacuum pump 60 weight as previously stated and shown in FIGS. 6 and 7.

The drain apparatus 30 that is to receive and support a portable motor vacuum pump 60, includes a housing 85 including a base portion 90, and a surrounding sidewall 95 extending upwardly therefrom the base portion 90. Wherein the surrounding sidewall 95 terminates in an upper end portion 100, the base 90 and the surrounding sidewall 95 define a housing interior 120 as separated from the exterior environment 125. Further included in the drain apparatus 30 is a partial margin extension portion 130 that includes an outer periphery 140 that is parallel in a plane to a portion of the surrounding sidewall 95, a support shoulder 160 that is parallel in a plane to the base 90, and an inner periphery 135 that is parallel in a plane to the outer periphery 140, all as best shown in FIGS. 4, 6, 7, and 8. The outer periphery 140 is adjacent to the portion of the surrounding sidewall 95 upper end portion 100 and termination, as best shown in FIGS. 1, 2, 3, and 5, wherein the partial margin extension portion 130 is oppositely disposed from the base portion 90.

Further included in the drain apparatus 30 is a divider 180 disposed adjacent to the inner periphery 135, the divider 180 having a motor vacuum pump mount platform portion 150 positioned parallel in a plane to the base 90 and adjacent to the inner periphery 135, as best shown in FIGS. 4, 6, 7, and 8. The motor vacuum pump mount platform portion 150 is to receive and support the portable motor vacuum pump 60. The divider 180 further having a convex configuration 185 being disposed inward of the motor vacuum pump mount platform portion 150, as best shown in FIGS. 1, 2, 3, 4, 6, 7, and 8, wherein the convex configuration 185 is facing the base portion 90. A portion 186 of the convex configuration 185 is adjacent to the surrounding sidewall 95 upper portion 100 termination, see FIGS. 1, 2, and 5, being operational to allow clearance for the motor 62 of the portable vacuum pump 60. The partial margin extension portion 130, the motor vacuum pump mount platform portion 150, and the divider 180 together separate the housing interior 120 into a first region 230 and a second region 235, the divider 180 having an aperture 240 for communication therethrough as between the first 230 and second 235 regions, as best shown in FIGS. 4, 6, and 7.

The housing 85 having an opening 275 communicating as between the second region 235 and the exterior environment 125, as best shown in FIGS. 1, 2, 3, and 5. The outer periphery 140, the support shoulder 160, the inner periphery 135, and the motor vacuum pump mount platform portion 150 form a "C" channel rigid beam in cross section, with the inner 135 and outer 140 peripheries forming parallel planes being about a portion of the surrounding sidewall 95 upper portion 100 termination that does not include portion 186 to support the portable motor vacuum pump 60 at the motor vacuum pump mount platform portion 150, see FIGS. 4, 6, 7, and 8. The partial margin extension portion 130 inner periphery 135 positions the motor vacuum pump mount platform portion 150 to be recessed toward the base 90 for a portion of the surrounding sidewall 95 that does not include portion 186, wherein the inner periphery 135 is operational to prevent the portable motor vacuum pump 60 blow down 510, 515 oil 81 from spraying beyond the inner periphery 135.

Method of Use

Referring in particular to FIGS. 6 and 7, a method for changing the oil 81 in a portable motor vacuum pump 60 having support feet 65, comprising the steps of firstly providing a drain apparatus 30 as previously described for the specific embodiment. Next a step of providing a portable motor vacuum pump 60 that needs an oil 81 change, again as best shown in FIGS. 6 and 7. Further, a step of placing 500 the portable motor vacuum pump 60 such that the support feet 65 are disposed within the partial margin extension portion 130 and being supported upon the platform portion 155 of the divider 180, and next a step positioning 505 the portable motor vacuum pump 60 to orient the pump 61 to be suspended over the aperture 240 or 250, as best shown in FIGS. 6 and 7. Further, a step of draining 510 the oil 81 from the pump 61 onto the divider 180, wherein the oil 81 after possibly spraying or spattering will eventually flow toward the aperture 240 or 250.

An optional added step in the method for changing the oil 81 in a portable motor vacuum pump 60, is a step of blowing down 515 the pump 61 subsequent to the draining step 510 above, with the blowing down 515 step being accomplished by activating 75 the motor pump 60 combination to blow out substantially all of the remaining contaminates from the pump 61, which will again possibly cause spray and spatter of the residual oil 81 coming out of the pump 61 at some pressure from the pump running, however, the drain apparatus as best shown in FIGS. 6 and 7, will minimize the dispersion of oil 81 into the external environment 125 to both prevent a safety hazard from oil 81 slippages by individual and to better protect the environment.

Conclusion

Accordingly, the present invention of a drain apparatus and method of using the same has been described with some degree of particularity directed to the embodiments of the present invention. It should be appreciated, though, that the present invention is defined by the following claims construed in light of the prior art so modifications the changes may be made to the exemplary embodiments of the present invention without departing from the inventive concepts contained therein.

The invention claimed is:

1. A drain apparatus to receive and support a portable motor vacuum pump, comprising:
  (a) a housing including a base portion, and a surrounding sidewall extending upwardly therefrom said base portion, wherein said surrounding sidewall terminates in an upper end portion, said base and said surrounding sidewall define a housing interior as separated from an exterior environment;
  (b) a partial margin extension portion that includes an outer periphery that is parallel in a plane to a portion of said surrounding sidewall, a support shoulder that is parallel in a plane to said base, and an inner periphery that is parallel in a plane to said outer periphery, said outer periphery is adjacent to said portion of said surrounding sidewall termination, wherein said partial margin extension portion is oppositely disposed from said base portion; and
  (c) a divider disposed adjacent to said inner periphery, said divider having a motor vacuum pump mount platform portion positioned parallel in a plane to said base and adjacent to said inner periphery, said motor vacuum pump mount platform portion to receive and support the portable motor vacuum pump, said divider further having a convex configuration being disposed inward of said motor vacuum pump mount platform portion, wherein said convex configuration is facing said base portion, a portion of said convex configuration being adjacent to said surrounding sidewall termination being operational to allow clearance for the motor of the vacuum pump, said partial margin extension portion, said motor vacuum pump mount platform portion, and said divider together separate said housing interior into a first region and a second region, said divider having an aperture for communication therethrough as between said first and second regions, said housing having an opening communicating as between said second region and the exterior environment, said outer periphery, said support shoulder, said inner periphery, and said motor vacuum pump mount platform portion form a "C" channel rigid beam, with said inner and outer peripheries forming parallel planes being about a portion of said surrounding sidewall termination to support the portable motor vacuum pump at said vacuum pump platform portion, said partial margin extension portion inner periphery positions said motor vacuum pump mount platform portion to be recessed toward said base for a portion of said surrounding sidewall, wherein said inner periphery is operational to prevent the portable motor vacuum pump blow down oil from spraying beyond said inner periphery.

2. A drain apparatus to receive and support a portable motor vacuum pump according to claim 1, wherein said convex configuration is in the form of a skewed pyramid, wherein said aperture is positioned at a peak of said skewed pyramid.

3. A drain apparatus to receive and support a portable motor vacuum pump according to claim 1 wherein said aperture further includes a removably engagable cover that is operational to facilitate said aperture to be in an open state for allowing fluid communication from said second region to said first region and a closed state that precludes communication from said second region to said first region.

4. A drain apparatus to receive and support a portable motor vacuum pump according to claim 3 wherein said housing has a fluid communication port as between said first region and the exterior environment, wherein said fluid communication port has an open state for allowing fluid communication from said first region to the exterior environment and a closed state that precludes communication from said first region to the exterior environment.

5. A drain apparatus to receive and support a portable motor vacuum pump according to claim 4 further comprising a handle adjacent to said surrounding sidewall, wherein said handle is operational to be manual handhold for moving said drain apparatus.

* * * * *